US012553327B2

(12) United States Patent
Zhao et al.

(10) Patent No.: US 12,553,327 B2
(45) Date of Patent: Feb. 17, 2026

(54) METHOD FOR SINGLE-STAGE TREATMENT OF SILICEOUS SUBTERRANEAN FORMATIONS (71) Applicant: Schlumberger Technology Corporation, Sugar Land, TX (US)

(72) Inventors: Haiyan Zhao, Houston, TX (US); Murtaza Ziauddin, Houston, TX (US); Temiloluwa Iyenoma Yusuf, Houston, TX (US); Patrice Abivin, Houston, TX (US); Juan-Carlos Santamaria, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 19/171,816

(22) Filed: Apr. 7, 2025

(65) Prior Publication Data

US 2025/0237132 A1 Jul. 24, 2025

Related U.S. Application Data (62) Division of application No. 18/552,296, filed as application No. PCT/US2022/021630 on Mar. 24, 2022, now Pat. No. 12,270,288.

(60) Provisional application No. 63/166,072, filed on Mar. 25, 2021.

(51) Int. Cl.
*E21B 43/27* (2006.01)
*C09K 8/74* (2006.01)

(52) U.S. Cl.
CPC .............. *E21B 43/27* (2020.05); *C09K 8/74* (2013.01)

(58) Field of Classification Search
CPC ...................................................... C09K 8/528
See application file for complete search history.

(56) References Cited

U.S. PATENT DOCUMENTS

| | | | |
|---|---|---|---|
| 2004/0177960 A1* | 9/2004 | Chan | C09K 8/72 166/308.1 |
| 2009/0025933 A1* | 1/2009 | Garcia-Lopez de Victoria | C09K 8/74 507/221 |
| 2009/0075844 A1* | 3/2009 | Ke | C09K 8/78 507/237 |
| 2009/0192057 A1* | 7/2009 | Frenier | C09K 8/74 507/240 |

* cited by examiner

*Primary Examiner* — Silvana C Runyan
(74) *Attorney, Agent, or Firm* — Jeffrey D. Frantz (57) ABSTRACT Methods and compositions for treating a siliceous geologic formation are described herein. An aqueous treatment composition for treating such formations includes a mixture of acids, an HF source, and a fluoride scale inhibitor. A pH of the aqueous treatment composition is between about 1.0 and about 3.0. The mixture of acids includes a first organic acid and a second organic acid and each acid of the mixture of acids has a non-zero, molecular weight less than 200 Daltons.

20 Claims, 6 Drawing Sheets

METHOD FOR SINGLE-STAGE TREATMENT OF SILICEOUS SUBTERRANEAN FORMATIONS

CROSS-REFERENCE TO RELATED APPLICATIONS

This application is a divisional of U.S. patent application Ser. No. 18/552,296, filed Sep. 25, 2023, which issued as U.S. Pat. No. 12,270,288 on Apr. 8, 2025, and which is a National Stage Entry of International Application No. PCT/US2022/021630, filed Mar. 24, 2022, which claims benefit of U.S. Provisional Patent Application Ser. No. 63/166,072, filed Mar. 25, 2021, which is entirely incorporated herein by reference.

FIELD

This disclosure relates to stimulation of hydrocarbon-containing subterranean formations. Specifically, methods of single-stage acid treatment of such formations is described herein.

BACKGROUND

Wells are generally drilled into subsurface rocks to access fluids, such as hydrocarbons, stored in subterranean formations. The subterranean fluids can be produced from these wells through known techniques. Acidic fluids are commonly injected into such formations to stimulate the formation and improve extraction of hydrocarbons from the formation. The acid dissolves, or otherwise removes, some mineral structures in the formation to improve hydrocarbon flow. In the particular case of sandstones, which contain siliceous minerals, hydrogen fluoride (HF) is used in many forms to dissolve the silica materials.

Calcium poses problems for these methods. In the case of HF treatment, calcium can precipitate as calcium fluoride, among other things. Operators therefore need methods of preventing calcium deposits from precipitating during acid treatment of formations. One such method is to treat the formation with a calcium-removing fluid prior to the acid treatment. The calcium-removing fluid dissolves calcium compounds in the formation, and when the fluid is removed, the calcium is removed or greatly reduced such that contact with acid results in, at most, only slight precipitation of calcium that does not hamper fluid conductivity.

Such methods suffer from the primary problem that the pre-treatment is not always precisely co-extensive with the acid treatment. Because the acid dissolves minerals, the acid can reach parts of the formation that were not exposed to calcium-removing fluid, resulting in calcium precipitation. Additionally, multiple stages of treatment use large volumes of treatment fluids. Methods are needed to prevent calcium precipitation during acid-treatment of hydrocarbon-containing siliceous formations. Also, reducing stages of treatment would reduce volume of treatment materials.

SUMMARY

Embodiments described herein provide a method of treating a siliceous geologic formation, the method comprising flowing an aqueous treatment composition into the formation, the aqueous treatment composition comprising an acid having molecular weight less than about 200, or an ammonium or sodium salt thereof, an HF source, and from about 0.1 wt % to about 2.0 wt % of a fluoride scale inhibitor, the aqueous treatment composition having a pH from about 1.0 to about 3.0

Other embodiments provide aqueous composition for treating hydrocarbon-containing formations, the composition comprising an acid having molecular weight less than about 200, or an ammonium or sodium salt thereof, an HF source, and from about 0.1 wt % to about 2.0 wt % of a fluoride scale inhibitor, the aqueous composition having a pH from about 1.0 to about 3.0.

Other embodiments described herein provide a method of treating a siliceous geologic formation, the method comprising obtaining an aqueous treatment composition comprising a mixture of organic acids having molecular weight less than about 200, or an ammonium or sodium salt thereof, an HF source, and from about 0.1 wt % to about 2.0 wt % of a fluoride scale inhibitor; using a mineral acid to adjust pH of the aqueous treatment composition to a range of about 1.0 to about 3.0 and flowing the pH-adjusted treatment fluid into the formation.

BRIEF DESCRIPTION OF THE DRAWINGS

Certain embodiments of the disclosure will hereafter be described with reference to the drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

DETAILED DESCRIPTION

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

Methods of treating a hydrocarbon formation to enhance recovery of hydrocarbons from the formation are described herein. The methods herein comprise treating the formation with a low pH acid solution containing a fluoride scale inhibitor. The fluoride scale inhibitor interrupts crystallization of fluoride deposits resulting from reaction of the acid solution with formation materials. The acid solution contains hydrogen fluoride (HF), hydrofluoric acid, and/or a source thereof, to dissolve and/or remove clay and other siliceous materials that can reduce fluid flow with the formation. Other acids, such as hydrochloric acid or other mineral acids and organic acids can also be added to bring acidity of the solution to a target or into a target range. The treatment fluids described herein have pH of, or adjusted to, about 1.0 to about 3.0, such as about 1.5 to about 2.5, for example about 2.0. The treatment methods and compositions described herein can be used beneficially without the need for an acid preflush in most cases.

The scale inhibitors used herein are a phosphonic acid, a phosphoric acid, a phosphonate, a phosphate, a polyacrylamide, a phosphonated polyetheramine, a salt of an acrylamido-methyl propane sulfonate/acrylic acid copolymer (AMPS/AA), phosphinated maleic copolymer (PHOS/MA), a salt of a polymaleic acid/acrylic acid/acrylamido-methyl propane sulfonate terpolymer (PMA/AMPS), organophosphonates and derivatives thereof, including hydroxyethylidene diphosphonic acid (HEDP) or salts thereof, 2-phosphonobutane-1,2,4-tricarboxylic acid (PBTC) or salts thereof, amino trimethylene phosphonic acid (ATMP) or salts thereof, diethylene triamine penta (methylene phosphonic acid) (DTPMPA) or salts thereof, 2-hydroxy phosphonoacetic acid (HPAA) or salts thereof, polyamino polyether methylene phosphonic acid (PAPEMP), bis(hexamethylene triamine penta (methylene phosphonic acid)) (BHMTPMP) or salts thereof, hydroxyethylamino-di(methylene phosphonic acid) (HEMPA) or salts thereof, ethylene diamine tetra (methylene phosphonic acid) (EDTMPA) or salts thereof, hexamethylenediaminetetra (methylenephosphonic Acid) (HMDTMPA) or salts thereof, phosphonated polyetheramine, a phosphate ester, or a mixture of any of the listed materials. Salts can be ammonium salts, sodium salts, lithium salts, or mixtures thereof.

The scale inhibitors herein inhibit the formation of metal ion-containing precipitation, such as calcium, aluminum, magnesium, ferric, et al, particularly fluoride precipitates. In sandstone acid treatment, calcium fluoride is the major precipitation causing damage when calcium-containing materials exist in the formation. The scale inhibitors herein prevent the formation of calcium fluoride precipitate and then eliminate the potential damage to the formation. The efficacy of the scale inhibitors depends on amount of scale inhibitor used and formation conditions (temperature, composition). The scale inhibitor is used at a concentration of 0.1 to 2% by weight in the treatment fluid. These scale inhibitors work to limit precipitation in the pH range of about 1.0 to about 3.0, such as about 1.5 to 2.5, for example about 2.0. Outside that pH range, the precipitation limiting function of the scale inhibitors is diminished.

The treatment fluid typically contains HF, or a source thereof such as ammonium bifluoride, and may contain other acids to bring pH to a target or within a target range. Acids used herein are typically simple acids, and/or salts thereof, having molar mass of about 200 Daltons or less. The acids can be organic and/or inorganic, and the organic acids can be substituted with halogen atoms such as fluorine, chlorine, bromine, and iodine. Examples include HCl, formic acid, acetic acid, chloroacetic acid, citric acid, phosphoric acid, perchloric acid, nitric acid, hydroiodic acid, iodic acid, uric acid, sulfonic acid, lactic acid, glycolic acid, glyceric acid, sulfamic acid, methylsulfamic acid, tartaric acid, succinic acid, fumaric acid, butyric acid, valeric acid, isovaleric acid, oxalic acid, malic acid, maleic acid. Substituted versions, for example isomers or versions of the above acids having heteroatoms such as sulfur, nitrogen, phosphorus, silicon, and the like, for example amino acids or acid amides, or other acid derivatives of any of the listed acids can also be used. Ammonium, sodium, or lithium salts thereof can also be included.

The treatment fluids herein can include other ingredients, such as Brønsted acids, corrosion inhibitors, mutual solvents, clay control agents, wetting agents, iron control agents, chelating agents, and fluid loss additives. Diversion control materials, such as ball sealers and particulate materials, can also be added to the treatment fluid. Particulate materials that can be included in the treatment fluid include polymers and copolymers of lactide, glycolide, amide, phosphate, and mixtures thereof, polyethyleneterephthalate (PET); polybutyleneterephthalate (PBT); polyethylenenaphthalenate (PEN); partially hydrolyzed polyvinyl acetate; polyacrylamide, polymethacrylanlide and derivatives, combinations, or mixtures thereof, any of which may be degradable or soluble. Chelants that can be used include maleic acid, tartaric acid, citric acid, nitrilotriacetic acid, hydroxyethyliminodiacetic acid, hydroxyethylethylenediaminetetraacetic acid, ethylenediaminetetraacetic acid, cyclohexylenediaminetetraacetic acid, diethylenetriaminepentaacetic acid, ammonium salts thereof, lithium salts thereof, sodium salts thereof, and mixtures thereof.

Other additives that can be used include fluoride binding agents, such as boric acid and aluminum chloride, inhibitors for precipitation of fluorosilicate and fluoroaluminate salts, and surfactants, which may be viscoelastic surfactants and/or other surfactants. Other additives that can be used include permanent clay stabilizers, non-emulsifiers, corrosion inhibitors, friction reducers, iron control agents, diverting agents, or fluid-loss control agents. These additives can be used alone or in any combination in the treatment fluids described herein.

Example 1

Figure 1:
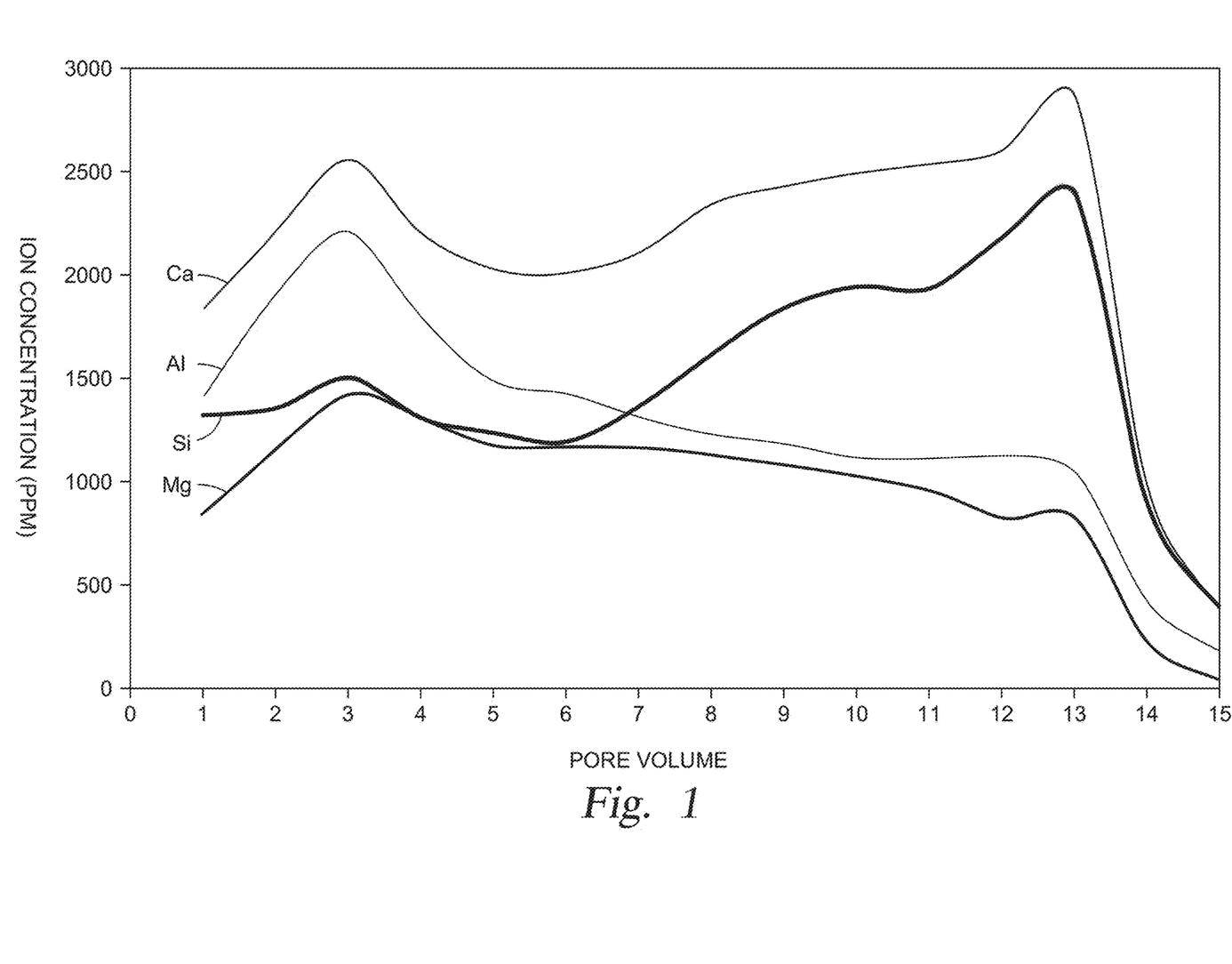
FIG. 1 is a graph showing results of a core treatment using an embodiment of the treatment fluids described herein.

A treatment fluid of 5 wt % citric acid, 5 wt % lactic acid, 0.5 wt % fluoride scale inhibitor, 0.5 wt % ammonium bifluoride, 3 wt % clay control agent, 0.18 wt % iron control agent, 10 wt % mutual solvent, and 0.5 wt % corrosion inhibitor was used to treat Berea Gray core at 160° F. The Berea sandstone core (1" diameter and 6" length) was tested in a Formation Response Tester Instrument, under a confining pressure of 2000 psi in a Viton sleeve and a back pressure of 600 psi. The Berea core was pre-saturated with 5 wt % NH$_4$Cl solution. The initial permeability of the Berea core ($k_i$) was measured by flowing 5 wt % NH$_4$Cl solution in the injection direction. Then 10 pore volumes of the treatment fluid were subsequently injected in the injection direction at 2 mL/min. During the acid injection, samples of effluent were collected for each pore volume, and were analyzed by inductively-coupled plasma (ICP) optical emission spectroscopy. The returned permeability (k) was measured by injecting 5 wt % NH$_4$Cl in the injection and product directions. Five pore volumes of the effluent were collected for ICP analysis. The concentrations of several metal ions in the effluent samples were plotted vs. injected pore volume in FIG. 1. The acid treatment led to a permeability ratio ($k_f/k_i$) of 144%, indicating that the Berea core was stimulated by this treatment fluid with a 44% permeability increase. The ICP plot in FIG. 1 shows that high concentration of calcium was maintained in the solution, indicating no fluorite precipitation. Moreover, the high concentrations of silicon and aluminum ions in the solution indicate that aluminosilicate materials of the core were efficiently dissolved and maintained in the solution with little or no precipitation.

Example 2

Figure 2:
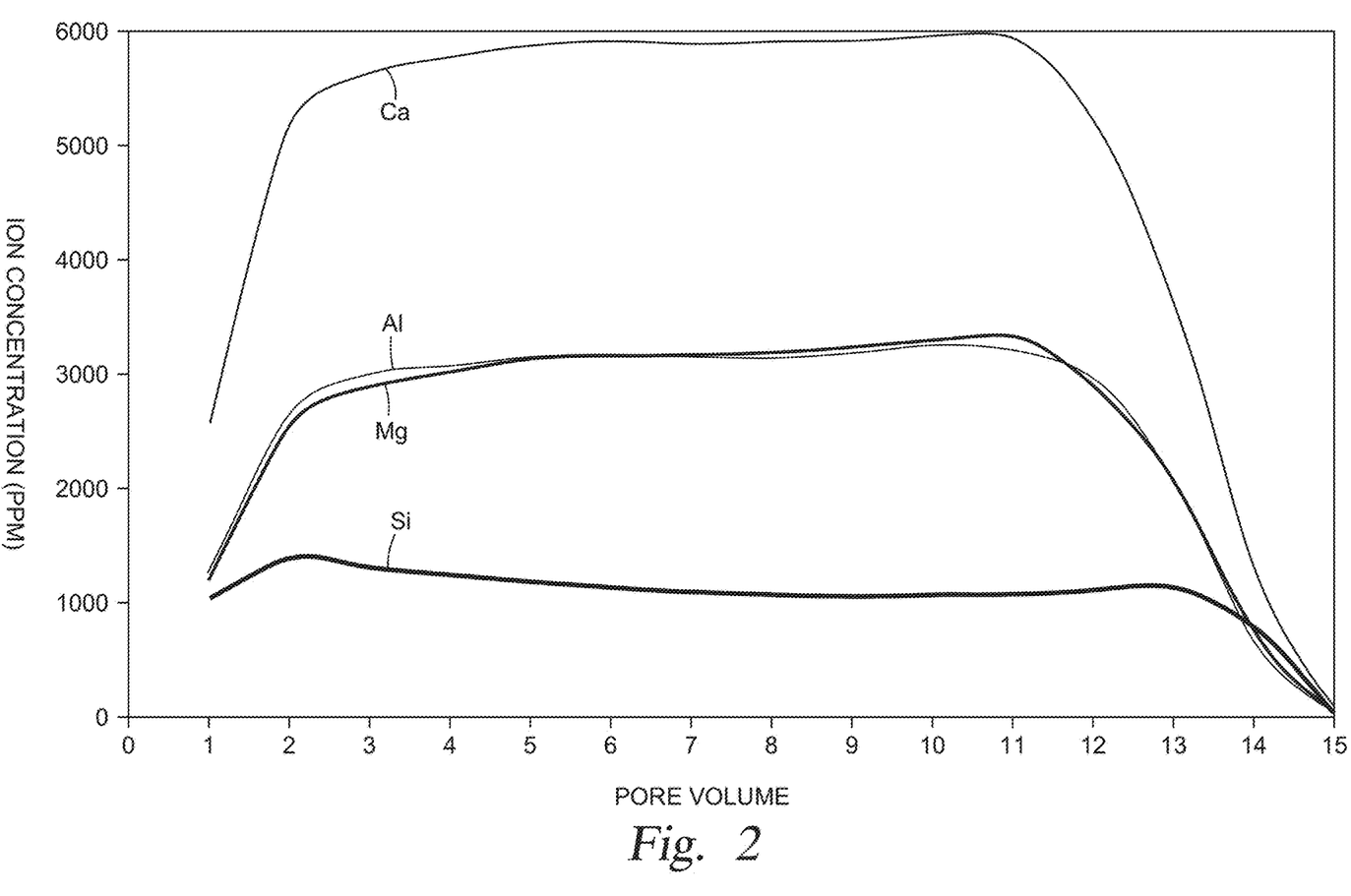
FIG. 2 is a graph showing results of another core treatment using an embodiment of the treatment fluids described herein.

The treatment fluid of 5 wt % citric acid, 5 wt % lactic acid, 0.5 wt % scale inhibitor, 0.5 wt % ammonium bifluoride, 3 wt % clay control agent, 0.18 wt % iron control agent, 10 wt % mutual solvent, and 0.5 wt % corrosion inhibitor, the same treatment fluid used in Example 1, was used to treat a Bandera Gray core at 160° F. using the same procedure as in Example 1. The ICP results were plotted in FIG. 2. Treatment of the Bandera Gray core led to a permeability ratio of 142%. The high concentrations of calcium, aluminum, and silicon ions in FIG. 2 again indicate efficient dissolution of calcium-containing materials and aluminosilicates during the treatment.

Example 3

Figure 3:
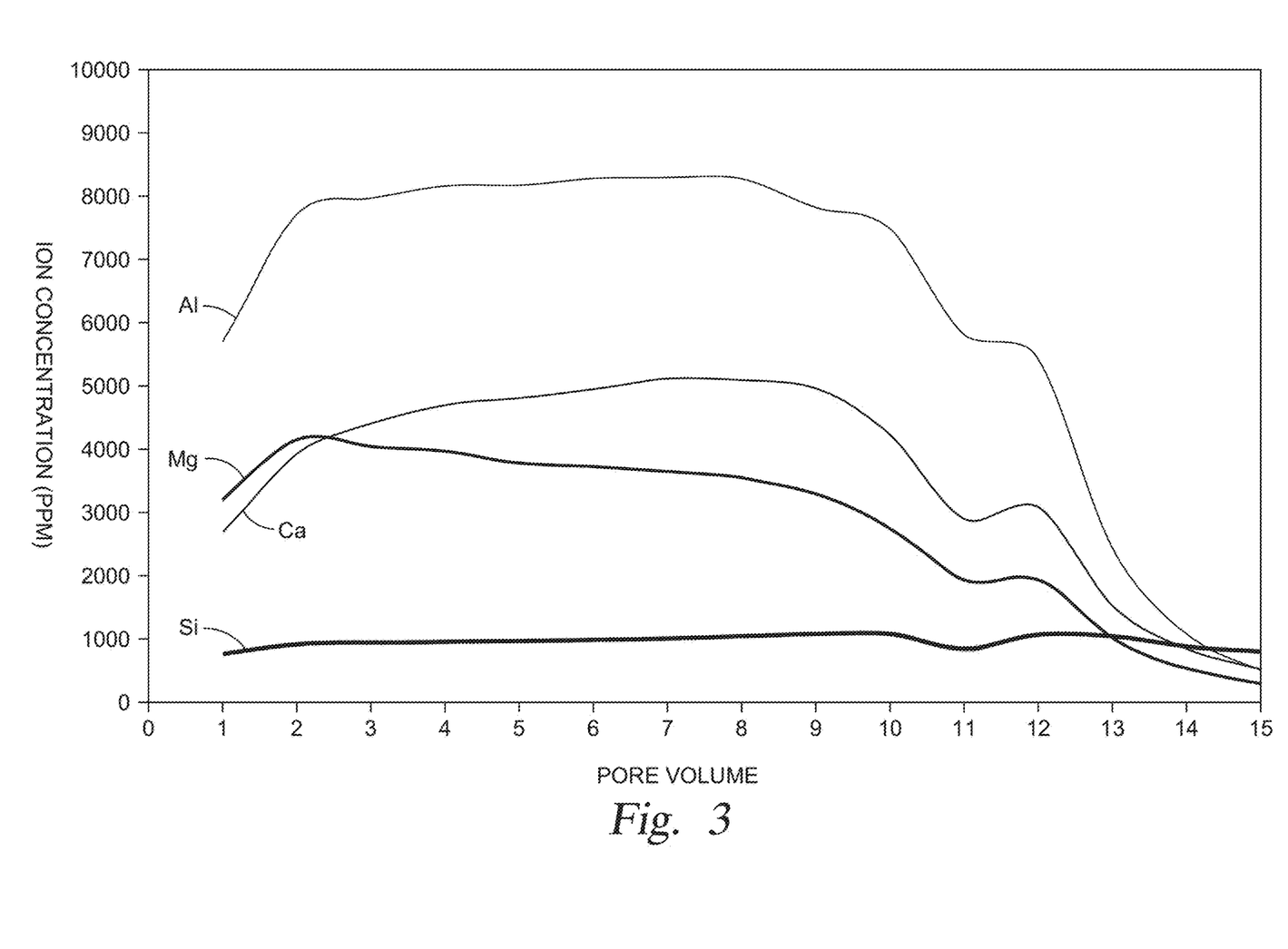
FIG. 3 is a graph showing results of another core treatment using an embodiment of the treatment fluids described herein.

The treatment fluid of 5 wt % citric acid, 5 wt % lactic acid, 0.5 wt % scale inhibitor, 1 wt % ammonium bifluoride, 3 wt % clay control agent, 0.18 wt % iron control agent, 10 wt % mutual solvent, and 0.5 wt % corrosion inhibitor, the same treatment fluid used for Examples 1 and 2, was used to treat a Bandera Gray core at 300° F. This treatment of Bandera Gray core led to a permeability ratio ($k_f/k_i$) of 408%. The high concentrations of calcium, aluminum, and silicon ions in FIG. 3 indicate efficient dissolution of calcium-containing materials and aluminosilicates during the acid treatment. Example 2 and 3 illustrate the effect of temperature on use of the treatment fluids described herein Example 4

Figure 4:
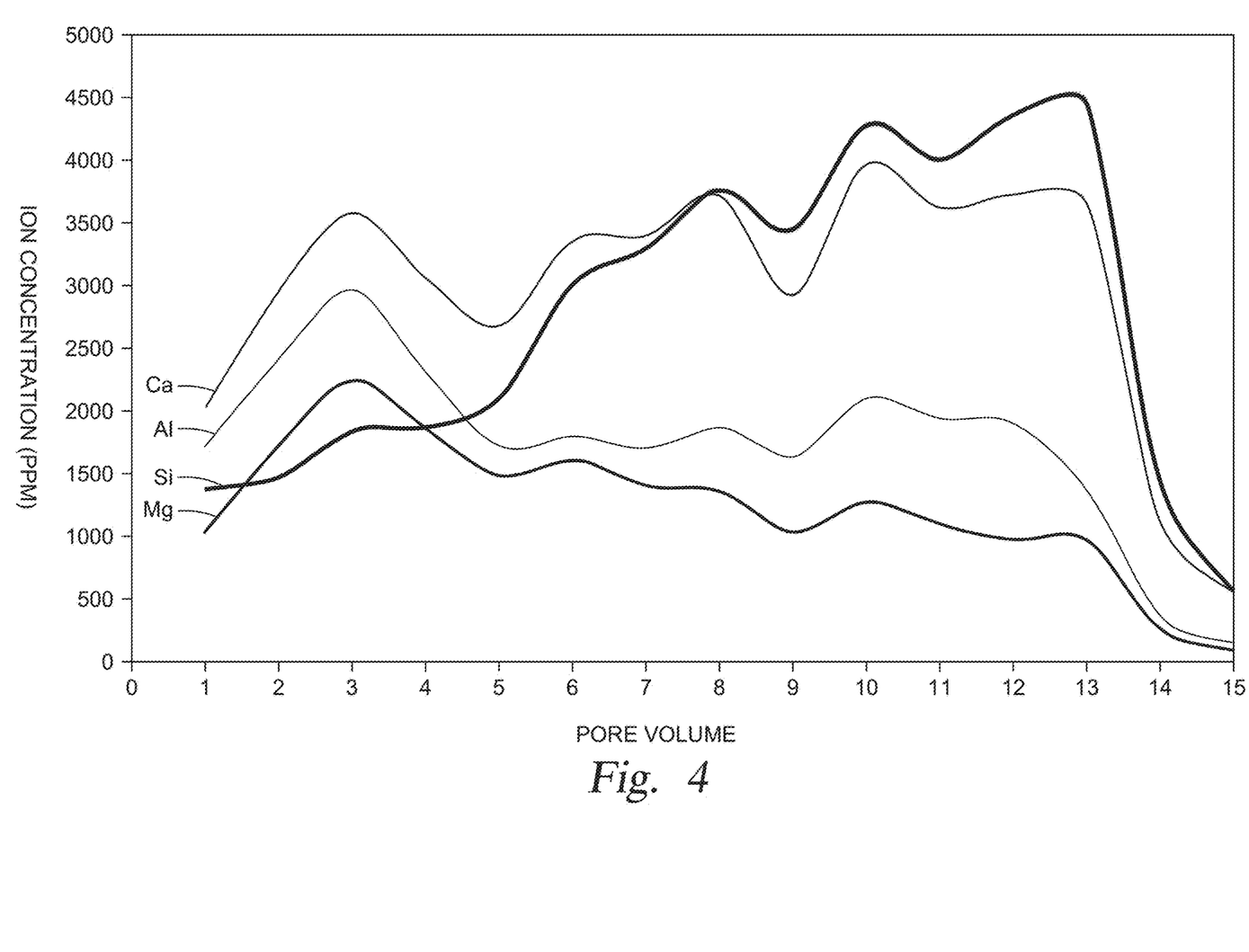
FIG. 4 is a graph showing results of another core treatment using an embodiment of the treatment fluids described herein.

A treatment fluid of 5 wt % citric acid, 5 wt % lactic acid, 0.25 wt % scale inhibitor, 1 wt % ammonium bifluoride, 3 wt % clay control agent, 0.18 wt % iron control agent, and 0.5 wt % corrosion inhibitor was used to treat a Berea Gray at 160° F. This treatment fluid uses half the concentration of scale inhibitor, relative to Examples 1-3, and uses no mutual solvent. This treatment led to a permeability ratio ($k_f/k_i$) of 112%. The high concentrations of calcium, aluminum, and silicon ions in FIG. 4 indicate efficient dissolution of calcium-containing materials and aluminosilicates during the treatment. Comparing the results of Example 4 to those of Examples 1 and 2, it is thought that the reduced quantity of scale inhibitor in this treatment fluid allowed more precipitation of fluorides, resulting in less permeability, but an increase in permeability nonetheless.

Example 5

Figure 5:
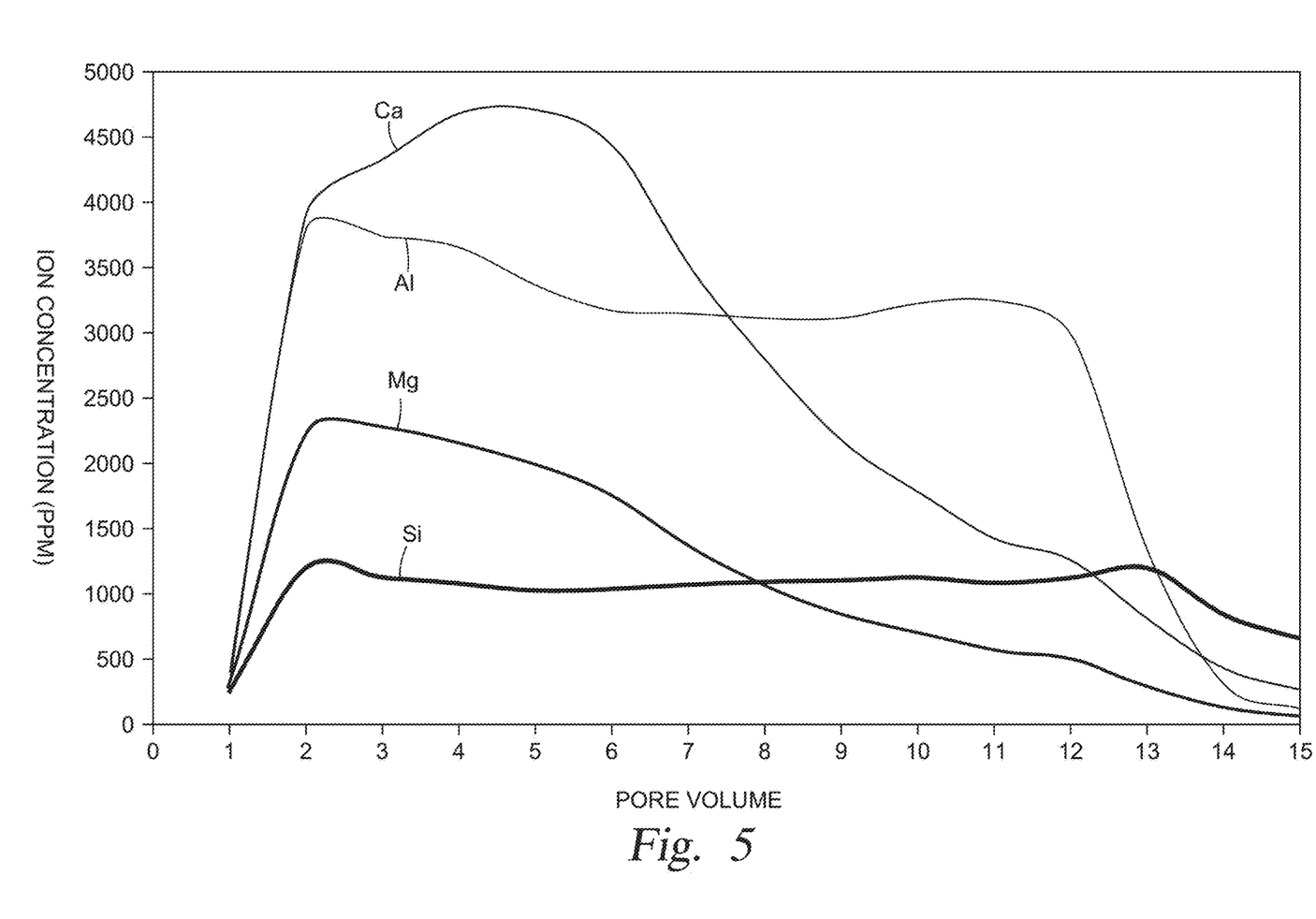
FIG. 5 is a graph showing results of another core treatment using an embodiment of the treatment fluids described herein.

A treatment fluid of 10 wt % organic acid blend, 2 wt % HCl, 0.5 wt % scale inhibitor, 0.5 wt % ammonium bifluoride, 3 wt % clay control agent, 0.18 wt % iron control agent, and 0.5 wt % corrosion inhibitor was used to treat Berea Gray at 250° F. This treatment fluid uses a small amount of HCl in addition to other acids. This treatment led to a permeability ratio ($k_f/k_i$) of 158%. The high concentrations of calcium, aluminum, and silicon ions in FIG. 5 indicate efficient dissolution of calcium-containing materials and aluminosilicates during the acid treatment.

Example 6

Figure 6:
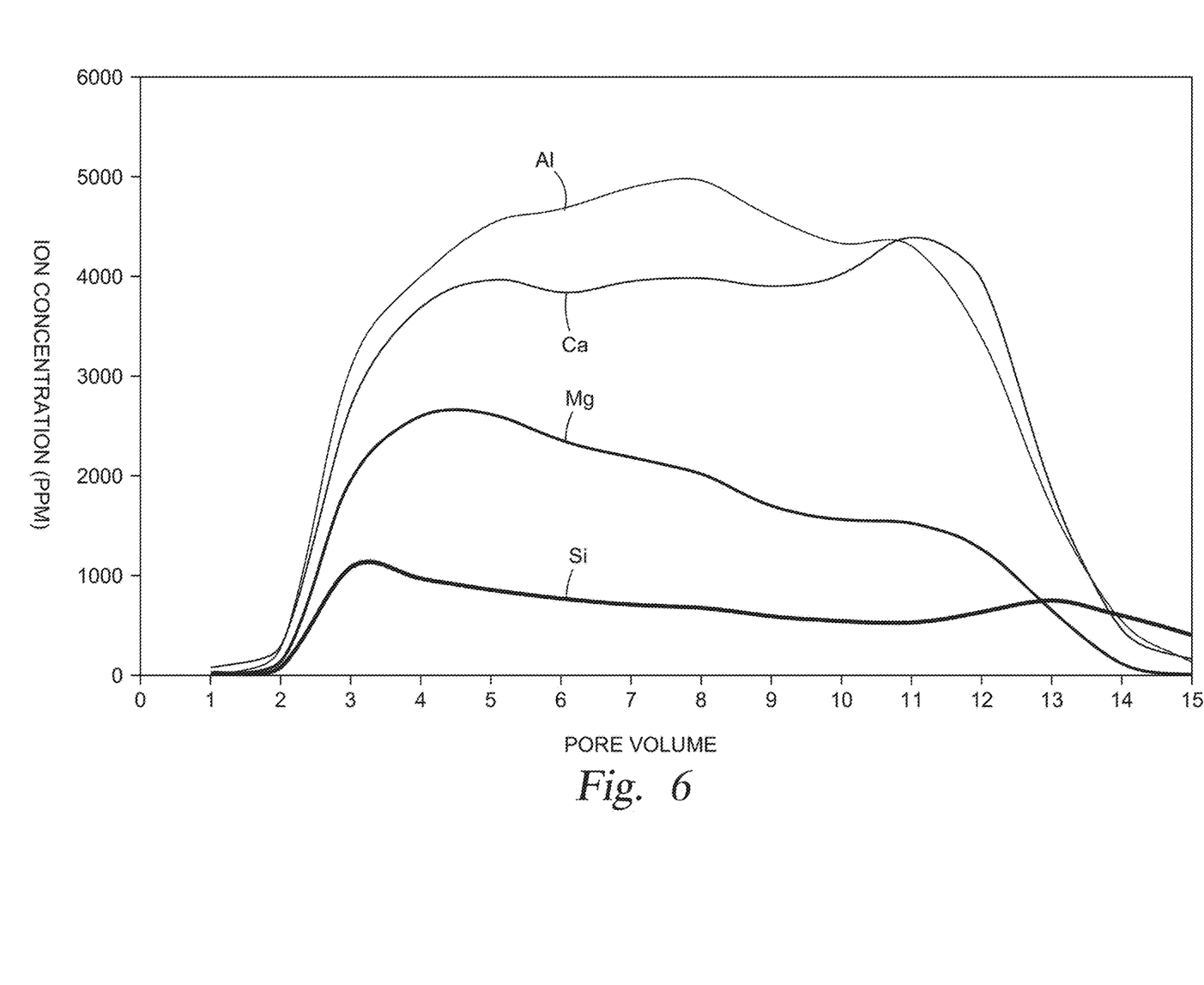
FIG. 6 is a graph showing results of another core treatment using an embodiment of the treatment fluids described herein.

A treatment fluid of 10 wt % organic acid blend, 2.2 wt % HCl, 0.5 wt % scale inhibitor, 1 wt % ammonium bifluoride, 3 wt % clay control agent, 0.18 wt % iron control agent, and 0.5 wt % corrosion inhibitor was used to treat Berea Gray at 200° F. The acid treatment led to a permeability ratio ($k_f/k_i$) of 121%. The high concentrations of calcium, aluminum, and silicon ions in FIG. 6 indicate efficient dissolution of calcium-containing materials and aluminosilicates during the acid treatment.

In Examples 1-4 above, the treatment fluid uses substantially equal weights of citric and lactic acid as an acid blend. In these Examples, the weight ratio of citric to lactic acid in the treatment fluid could range from 3:7 to 7:3. Thus, for example, instead of 5 wt % citric acid and 5 wt % lactic acid, 4 wt % citric acid and 6 wt % lactic acid could be used, 3 wt % citric acid and 7 wt % lactic acid could be used, 6 wt % citric acid and 4 wt % lactic acid could be used, and 7 wt % citric acid and 3 wt % lactic acid could be used. For Examples 5 and 6 above, the 10 wt % organic acid could be a single organic acid, of any of the acids described herein, or any mixture of the organic acids described herein.

The treatment fluids described herein can be used, in some cases, to perform an acid treatment of a sandstone formation using only one stage of treatment. Because the use of fluoride scale inhibitor reduces the formation of fluoride scales in the formation during the acid treatment, the single stage treatment can be effective in removing calcium, aluminum, and silicon debris from the formation without creating diversions that can reduce the effectiveness of the acid treatment. Single-stage acid treatment of sandstone formations reduces the time to perform the treatment and reduces the volume of treatment fluid used for the treatment. Reduced volume of treatment fluid also reduces the volume of any flowback fluid handling.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. An aqueous composition for treating hydrocarbon-containing formations, the aqueous composition comprising:
   a mixture of acids, each acid of the mixture of acids having a non-zero, molecular weight less than 200 Daltons, wherein the mixture of acids comprises a first organic acid and a second organic acid, and wherein a weight ratio of the first organic acid to the second organic acid is between 3:7 and 7:3, inclusive;
   an HF source; and
   from 0.1 wt % to 2.0 wt % of a fluoride scale inhibitor;
   wherein the aqueous composition has a pH from 1.0 to 3.0.

2. The aqueous composition of claim 1, wherein the first organic acid is citric acid and the second organic acid is lactic acid.

3. The aqueous composition of claim 1, wherein the mixture of acids comprises one or more mineral acids.

4. The aqueous composition of claim 1, wherein each acid of the mixture of acids has a non-zero, molecular weight between 36 and 200 Daltons.

5. The aqueous composition of claim 1, wherein the fluoride scale inhibitor is a phosphonic acid, a phosphoric acid, a phosphonate, a phosphate, a polyacrylamide, a phosphonated polyetheramine, a salt of an acrylamido-methyl propane sulfonate/acrylic acid copolymer, phosphinated maleic copolymer, a salt of a polymaleic acid/acrylic acid/ acrylamido-methyl propane sulfonate terpolymer, or a mixture of any two or more thereof.

6. The aqueous composition of claim 1, wherein the fluoride scale inhibitor is hydroxyethylidene diphosphonic acid (HEDP) or a salt thereof, 2-phosphonobutane-1,2,4-tricarboxylic acid (PBTC) or a salt thereof, amino trimethylene phosphonic acid (ATMP) or a salt thereof, diethylene triamine penta (methylene phosphonic acid) (DTPMPA) or a salt thereof, 2-hydroxy phosphonoacetic acid (HPAA) or a salt thereof, polyamino polyether methylene phosphonic acid (PAPEMP), bis(hexamethylene triamine penta (methylene phosphonic acid)) (BHMTPMP) or a salt thereof, hydroxyethylamino-di(methylene phosphonic acid) (HEMPA) or a salt thereof, ethylene diamine tetra (methylene phosphonic acid) (EDTMPA) or a salt thereof, or hexamethylenediaminetetra (methylenephosphonic acid) (HMDTMPA) or a salt thereof.

7. The aqueous composition of claim 1, further comprising one or more of a chelant, a fluoride binding agent, a fluorosilicate precipitation inhibitor, a fluoroaluminate precipitation inhibitor, a particulate material, a viscoelastic surfactant, a permanent clay stabilizer, a non-emulsifier, a corrosion inhibitor, a friction reducer, an iron control agent, a diverting agent, or a fluid-loss control agent.

8. A method of treating a siliceous geologic formation, the method comprising:
adjusting the pH of the aqueous composition of claim 1 to a range of 1.0 to 3.0; and
causing the aqueous composition to flow into the siliceous geologic formation.

9. The method of claim 8, wherein the first organic acid is citric acid and the second organic acid is lactic acid.

10. The method of claim 8, wherein the mixture of acids comprises one or more mineral acids.

11. The method of claim 8, wherein each acid of the mixture of acids has a non-zero, molecular weight between 36 and 200 Daltons.

12. The method of claim 8, wherein the fluoride scale inhibitor is a phosphonic acid, a phosphoric acid, a phosphonate, a phosphate, a polyacrylamide, a phosphonated polyetheramine, a salt of an acrylamido-methyl propane sulfonate/acrylic acid copolymer, phosphinated maleic copolymer, a salt of a polymaleic acid/acrylic acid/acrylamido-methyl propane sulfonate terpolymer, or a mixture of any two or more thereof.

13. The method of claim 8, wherein the fluoride scale inhibitor is hydroxyethylidene diphosphonic acid (HEDP) or a salt thereof, 2-phosphonobutane-1,2,4-tricarboxylic acid (PBTC) or a salt thereof, amino trimethylene phosphonic acid (ATMP) or a salt thereof, diethylene triamine penta (methylene phosphonic acid) (DTPMPA) or a salt thereof, 2-hydroxy phosphonoacetic acid (HPAA) or a salt thereof, polyamino polyether methylene phosphonic acid (PAPEMP), bis(hexamethylene triamine penta (methylene phosphonic acid)) (BHMTPMP) or a salt thereof, hydroxyethylamino-di(methylene phosphonic acid) (HEMPA) or a salt thereof, ethylene diamine tetra (methylene phosphonic acid) (EDTMPA) or a salt thereof, or hexamethylenediaminetetra (methylenephosphonic acid) (HMDTMPA) or a salt thereof.

14. The method of claim 8, wherein causing the aqueous composition to flow into the siliceous geologic formation is an only stage of acid treatment performed on the siliceous geologic formation.

15. An aqueous composition for treating hydrocarbon-containing formations, the aqueous composition comprising:
a mixture of acids, each acid of the mixture of acids having a non-zero, molecular weight less than 200 Daltons, wherein the mixture of acids comprises a first organic acid and a second organic acid, and wherein the first organic acid and the second organic acid are independently present in the aqueous composition in an amount between 3 wt % and 7 wt %;
an HF source; and
from 0.1 wt % to 2.0 wt % of a fluoride scale inhibitor;
wherein the aqueous composition has a pH from 1.0 to 3.0.

16. The aqueous composition of claim 15, wherein the first organic acid is citric acid and the second organic acid is lactic acid.

17. The aqueous composition of claim 15, wherein the mixture of acids comprises one or more mineral acids.

18. The aqueous composition of claim 15, wherein each acid of the mixture of acids has a non-zero, molecular weight between 36 and 200 Daltons.

19. The aqueous composition of claim 15, wherein the fluoride scale inhibitor is a phosphonic acid, a phosphoric acid, a phosphonate, a phosphate, a polyacrylamide, a phosphonated polyetheramine, a salt of an acrylamido-methyl propane sulfonate/acrylic acid copolymer, phosphinated maleic copolymer, a salt of a polymaleic acid/acrylic acid/acrylamido-methyl propane sulfonate terpolymer, or a mixture of any two or more thereof.

20. The aqueous composition of claim 15, further comprising one or more of a chelant, a fluoride binding agent, a fluorosilicate precipitation inhibitor, a fluoroaluminate precipitation inhibitor, a particulate material, a viscoelastic surfactant, a permanent clay stabilizer, a non-emulsifier, a corrosion inhibitor, a friction reducer, an iron control agent, a diverting agent, or a fluid-loss control agent.

* * * * *